Sept. 13, 1949.   W. REINKING   2,482,028
TRUCK UNLOADING MECHANISM
Filed Feb. 28, 1947
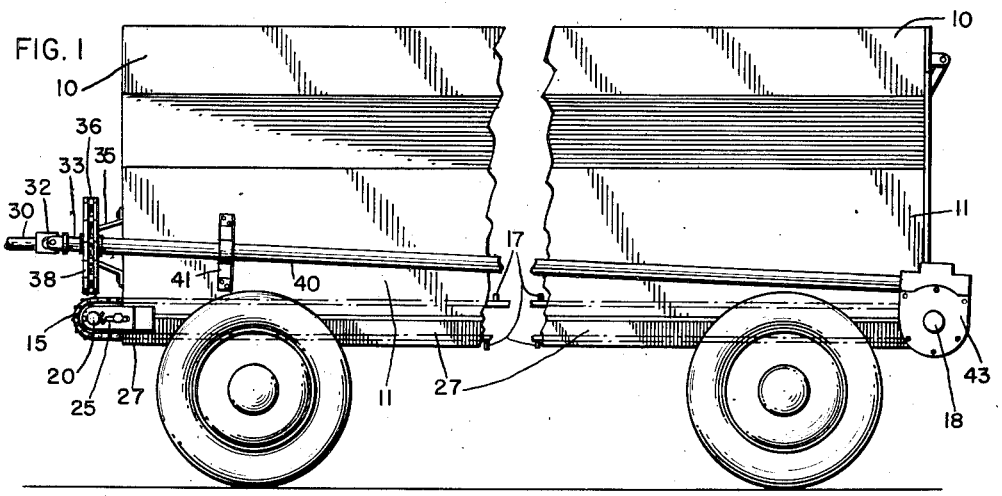
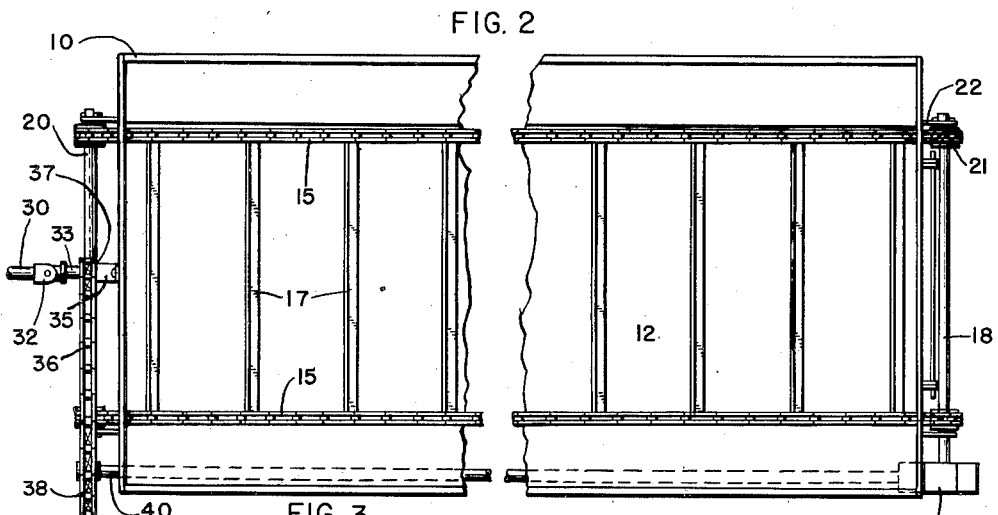
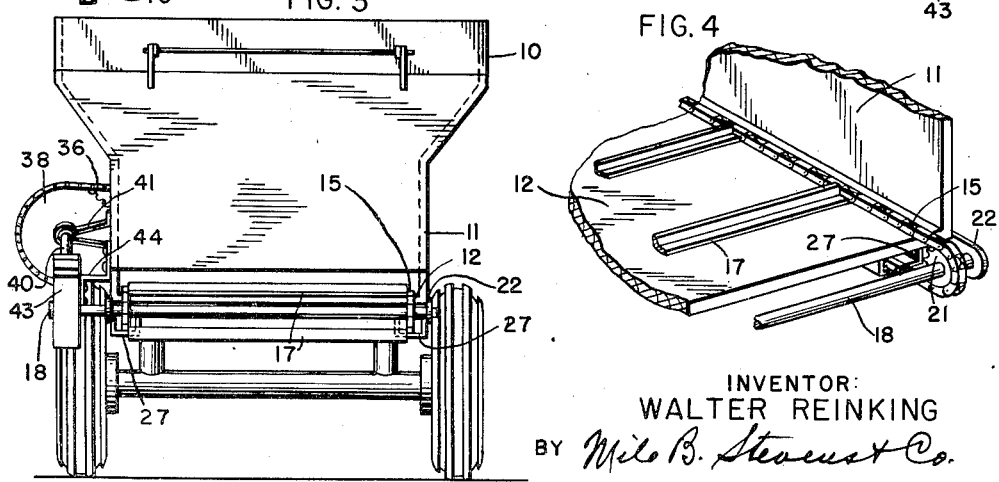
INVENTOR:
WALTER REINKING
BY Milo B. Stevens & Co.
ATTORNEYS.

Patented Sept. 13, 1949

2,482,023

UNITED STATES PATENT OFFICE 2,482,028

TRUCK UNLOADING MECHANISM

Walter Reinking, Roselle, Ill.

Application February 28, 1947, Serial No. 731,668

1 Claim. (Cl. 214—83.36)

My invention relates to unloading mechanisms, and more particularly to such as are applicable to vehicles to facilitate the unloading thereof.

One object of the present invention is to provide a mechanism which is carried by a wagon or trailer and receives its power from a leading vehicle such as a truck or tractor.

A further object is to provide a mechanism of the above character which includes a conveyor rearwardly movable in the bottom of the wagon and effective to rapidly unload the contents thereof.

Another object is to provide a mechanism whose driving parts are on the outside of the wagon, leaving a maximum amount of space in the same for the material carried or unloaded.

An important object is to design the novel mechanism along lines of simplicity and durability.

With the above objects in view, and any others which may suggest themselves from the description to follow, a better understanding of the invention may be had by reference to the accompanying drawing, in which—

Fig. 1 is a side elevation of a wagon equipped with the novel unloading mechanism, the view being broken away in an intermediate zone;

Fig. 2 is a similar top plan view;

Fig. 3 is a rear end view; and

Fig. 4 is a perspective view of the right hand rear portion of the conveyor.

When corn, grain or silage has been gathered on the field, it is customary for it to be loaded into wagons, and the latter driven to a silo or other place where the material is to be unloaded. Usually, manual labor is employed to shovel the material out of the wagon; and in some cases the front end thereof is equipped with a hydraulic lift to procure the more expeditious dumping of the material at the rear. The first method entails time and expense, while the second requires a specially equipped wagon. It has therefore been my intention to design a wagon for the above purpose with a simple mechanism which may conveniently receive its power from the leading vehicle and keep the cost of the equipment and operation down.

In accordance with the foregoing, specific reference to the drawing indicates a typical farm wagon at 10, its side walls being shown at 11 and its bottom at 12.

The conveyor previously referred to comprises a pair of laterally spaced chains 15 whose runs receive the bottom 12 of the wagon between them. As indicated in Figs. 2 and 4, the chains occur next inwardly of the wagon side 11; and the upper chain runs carry transverse angle bars 17 which act as scoops or scrapers when moving rearwardly over the floor of the bottom 12, so as to draw the material in the wagon rearwardly to be discharged therefrom.

The conveyor operates between rear and frontal shafts 18 and 20, respectively, the rear shaft 18 having sprockets for the chains and being supported in bearing brackets 22 extending from the sides of the wagon at the front. The frontal installation is similar, except that a take-up device 25 is associated with the bearings for adjustment in case of slack in the chains. The bottom 12 receives a pair of longitudinal channels 27 underneath the chains to protect them from material apt to clog or obstruct their bottom runs.

The drive for the conveyor originates with a shaft 30 which leads back from the power take-off of a truck, tractor or other leading vehicle. The shaft 30 receives a universal joint 32 and terminates with an extension 33 which is supported in a bearing bracket 35 mounted on the front of the wagon. Fig. 2 shows more clearly that a reducing chain drive 36 is led from a small sprocket 37 on the shaft 33 laterally to a large one 38 carried by a shaft 40 spaced laterally from one of the wagon walls 11. The shaft 40 extends rearwardly by way of one or more bearings 41 attached to the said wagon wall, and leads into a transmission housing 43 attached to the same wagon wall at the rear as indicated at 44. The housing 43 encases a conventional worm drive which transmits slow speed from the shaft 40 to the conveyor shaft 18.

It is now evident that a wagon equipped as described above may be fully loaded on the field and drawn by the leading vehicle to the place of delivery. Here the power take-off is put in action to induce the operation of the wagon conveyor and quickly accomplish the unloading of the wagon. As previously mentioned, the driving mechanisms for the above operation is largely on the outside of the wagon, and therefore presents no obstacle to the rapid unloading thereof. The unloading portion of the mechanism only takes up a slight amount of room, allowing the wagon practically full capacity for its contents. Also, the unloading mechanism is composed of a few parts which are simple and mostly in the open, to be readily accessible in case of repair or other attention. Finally, the nature of the mechanism enables it to be produced at relatively small expense and made sufficiently sturdy for long and trouble-free use.

While I have described the invention along specific lines, various minor changes or refinements may be made therein without departing from its principle, and I reserve the right to employ all such changes and refinements as may come within the scope and spirit of the appended claim.

I claim:

An unloading mechanism for a wagon comprising a conveyor over the wagon floor and operative from front to rear, scraper elements carried by the conveyor engaging said floor, a drive from a power source to operate the conveyor, said conveyor comprising a pair of chains from front to rear receiving the wagon floor between their runs, the upper chain runs extending inwardly of the wagon side walls, U-shaped channels completely enclosing the lower runs of the chains, front and rear sprocket sets for the chains, cross-shafts carrying the sprocket sets, said drive originating with a shaft in the center of the wagon front and including a second shaft extending from front to rear along one side of the wagon, a speed-reducing chain drive between the first and second shafts, and a worm drive speed-reducing connection between the rear end of the second shaft and the rear cross-shaft.

WALTER REINKING.

REFERENCES CITED

The following references are of record in the file of this patent:

UNITED STATES PATENTS

| Number | Name | Date |
| --- | --- | --- |
| 1,441,746 | Parson | Jan. 9, 1923 |
| 1,555,654 | Garrett | Sept. 29, 1925 |
| 1,979,945 | Kranick | Nov. 6, 1934 |
| 2,166,135 | Fletcher | July 18, 1939 |
| 2,321,168 | Tognetti | June 8, 1943 |
| 2,405,534 | Voth | Aug. 6, 1946 |
| 2,426,980 | Ball | Sept. 9, 1947 |